(12) United States Patent
Oyanagi et al.

(10) Patent No.: US 8,547,571 B2
(45) Date of Patent: Oct. 1, 2013

(54) PRINT CONTROL APPARATUS FOR PERFORMING PREPROCESSING OF IMAGE DATA

(75) Inventors: Makoto Oyanagi, Suwa (JP); Kanako Ide, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1054 days.

(21) Appl. No.: 11/655,568

(22) Filed: Jan. 18, 2007

(65) Prior Publication Data
US 2007/0171489 A1 Jul. 26, 2007

(30) Foreign Application Priority Data

Jan. 20, 2006 (JP) .................................. 2006-11900

(51) Int. Cl.
| | |
|---|---|
| G06F 3/12 | (2006.01) |
| G06K 15/02 | (2006.01) |
| H04N 1/40 | (2006.01) |
| H04N 1/60 | (2006.01) |
| H04N 5/77 | (2006.01) |
| G06T 5/00 | (2006.01) |

(52) U.S. Cl.
USPC ............ 358/1.15; 358/518; 358/1.9; 358/2.1; 382/167; 348/231.6

(58) Field of Classification Search
None
See application file for complete search history.

(56) References Cited

U.S. PATENT DOCUMENTS

| | | | |
|---|---|---|---|
| 6,836,565 B1 * | 12/2004 | Nishikawa | 382/167 |
| 7,324,749 B2 * | 1/2008 | Kubo | 396/429 |
| 7,564,603 B2 * | 7/2009 | Hoshii | 358/518 |
| 2001/0043358 A1 | 11/2001 | Schwartz | |

(Continued)

FOREIGN PATENT DOCUMENTS

| | | |
|---|---|---|
| JP | 2000-165647 A | 6/2000 |
| JP | 2001-165647 | 6/2001 |

(Continued)

OTHER PUBLICATIONS

Office Action issued on Jan. 22, 2010 in the U.S. Appl. No. 11/899,480.

(Continued)

*Primary Examiner* — Barbara Reinier
(74) *Attorney, Agent, or Firm* — Nutter McClennen & Fish LLP; John J. Penny, Jr.; Christina M. Sperry

(57) ABSTRACT

In response to a print instruction of a specified print object image, the print control apparatus of the invention corrects print object image data representing the specified print object image with a preset correction parameter set for improving picture quality of the specified print object image and prints the specified print object image according to corrected print object image data. A print object image specification module of the print control apparatus specifies the print object image as a printing object. A preprocessing execution module of the print control apparatus performs predetermined preprocessing of the print object image data representing the specified print object image to set the correction parameter used for correcting the specified print object image. In response to specification of the print object image by the print object image specification module, a preprocessing management module of the print control apparatus instructs the preprocessing execution module to implement advanced preprocessing of the print object image data representing the specified print object image, prior to the print instruction. This arrangement of the invention desirably shortens a time period elapsed before start of required image processing for printing the specified print object image.

7 Claims, 11 Drawing Sheets

(56) References Cited

U.S. PATENT DOCUMENTS

| | | | |
|---|---|---|---|
| 2003/0016376 A1* | 1/2003 | Narushima | 358/1.13 |
| 2003/0156196 A1* | 8/2003 | Kato et al. | 348/207.2 |
| 2004/0090534 A1* | 5/2004 | Nakami et al. | 348/220.1 |
| 2004/0233301 A1* | 11/2004 | Nakata et al. | 348/239 |
| 2005/0005061 A1* | 1/2005 | Robins | 711/104 |
| 2005/0047656 A1* | 3/2005 | Luo et al. | 382/167 |
| 2005/0057776 A1* | 3/2005 | Furukawa et al. | 358/2.1 |
| 2005/0219559 A1* | 10/2005 | Ito et al. | 358/1.2 |
| 2006/0008173 A1* | 1/2006 | Matsugu et al. | 382/274 |
| 2006/0093212 A1 | 5/2006 | Steinberg et al. | |
| 2006/0232815 A1* | 10/2006 | Matsuhira | 358/1.15 |
| 2006/0290960 A1 | 12/2006 | Matsuhira | |
| 2007/0139741 A1 | 6/2007 | Takami et al. | |

FOREIGN PATENT DOCUMENTS

| | | |
|---|---|---|
| JP | 2004280167 | 10/2004 |
| JP | 2005111945 | 4/2005 |
| JP | 2005169650 | 6/2005 |
| JP | 2005287015 | 10/2005 |

OTHER PUBLICATIONS

Office Action issued on Jul. 8, 2010 in the U.S. Appl. No. 11/899,480.
Notice of Allowance issued on Nov. 5, 2010 in the U.S. Appl. No. 11/899,480.

* cited by examiner

PRINT CONTROL APPARATUS FOR PERFORMING PREPROCESSING OF IMAGE DATA

BACKGROUND OF THE INVENTION

1. Field of the Invention

The present invention relates to a series of image processing performed to print images taken with imaging devices, such as digital cameras.

2. Description of the Related Art

Printers commonly used in the field are capable of directly reading image data, which have been taken with an imaging device, such as a digital camera, and have been stored in a storage medium like a memory card, without a personal computer and printing images represented by the read image data. These common printers are also capable of directly reading image data from the imaging device, such as the digital camera, and printing images represented by the read image data. In the description below, the images taken with such an imaging device are referred to as 'photo images', and image data representing the photo images are referred to as 'photo image data'. The printer that is capable of printing the photo images is called the 'photo printer'.

The photo printer performs various image correction operations of the read photo image data as part of image processing required to ensure an adequate printing result of the photo image. The proposed image correction technique for correcting the photo image data is disclosed in, for example, Japanese Patent Laid-Open Gazette No. 2001-165647.

The photo printer requires preprocessing for the image correction. A typical procedure of preprocessing reads photo image data, samples pixel data from the read photo image data at a predetermined proportion to create a histogram, and performs a statistical process according to the created histogram to specify characteristic amounts representing the characteristics of the photo image and accordingly set correction parameters required for the image correction. The photo printer corrects the photo image data with the set correction parameters in the course of image processing executed for printing the photo image. The procedure of preprocessing may also perform a face recognition process to recognize the presence of any human face in the photo image and set the correction parameters required for the image correction. The procedure of preprocessing may further perform a red-eye reduction process to reduce the red-eye of the human face included in the photo image and set the correction parameters required for the image correction.

Such preprocessing is required for setting the correction parameters, prior to the required image correction and other required series of image processing for printing each photo image. When the user specifies a desired photo image for printing and gives a print start instruction, a certain time period is required for execution of the preprocessing before the actual start of the image processing of photo image data representing the specified photo image. Namely there is a relatively long wait time before start of the actual printing operation.

The photo image data are generally compressed in a specific compression format, for example, in a JPEG (Joint Photographic Coding Experts Group) format. Expansion of the photo image data compressed in the JPEG format is required before execution of the required image processing or the required preprocessing. This further extends the total wait time.

SUMMARY OF THE INVENTION

The object of the invention is to eliminate the drawbacks of the prior art and to provide a technique of shortening a time period elapsed before start of required image processing for printing a print object image specified as a desired printing object and thereby shortening a wait time before start of the actual printing operation.

In order to attain at least part of the above and the other related objects, the present invention is directed to a print control apparatus that, in response to a print instruction of a specified print object image, corrects print object image data representing the specified print object image with a preset correction parameter set for improving picture quality of the specified print object image and prints the specified print object image according to corrected print object image data.

The print control apparatus includes: a print object image specification module that specifies the print object image as a printing object; a preprocessing execution module that performs predetermined preprocessing of the print object image data representing the specified print object image to set the correction parameter used for correcting the specified print object image; and a preprocessing management module that, in response to specification of the print object image by the print object image specification module, instructs the preprocessing execution module to implement advanced preprocessing of the print object image data representing the specified print object image, prior to the print instruction.

The print control apparatus of the invention enables advanced implementation of the predetermined preprocessing of the specified print object image prior to the print instruction of the specified print object image. This arrangement desirably shortens a time period elapsed before start of required image processing for printing the specified print object image and thereby shortens a wait time before start of the actual printing operation, compared with the conventional print control apparatus that executes the predetermined preprocessing after the print instruction.

In the print control apparatus of the invention, it is preferable that the preprocessing management module instructs the preprocessing execution module to implement advanced preprocessing in a preset order with regard to plural unprocessed preprocessing requests of plural print object images specified by the print object image specification module.

This arrangement enables efficient instruction for advanced implementation of required preprocessing even when the specification order of plural print object images is different from the preset order of actual printing operations.

In the print control apparatus of the invention, the correction parameter may include at least one parameter selected from a first parameter group obtained by a statistical process of the print object image data representing the specified print object image, a second parameter group obtained by a face recognition process of the print object image data, and a third parameter group obtained by a red-eye reduction process of the print object image data.

In one preferable embodiment of the invention, the print control apparatus further includes a data expansion module that expands compressed image data in a specific format.

The print object image specification module displays a preview image based on expanded image data, which is obtained by expansion of compressed image data by the data expansion module, and, in response to selection of the displayed preview image as a printing object, specifies an image represented by the expanded image data corresponding to the selected preview image as a print object image. The preprocessing management module instructs the preprocessing execution module to implement advanced preprocessing of the expanded image data as the print object image data.

In one preferable application of the print control apparatus of the above embodiment, in response to specification of the image represented by the expanded image data as the print object image, the preprocessing management module instructs the preprocessing execution module to perform sampling of predetermined pixels from the expanded image data and to set the correction parameter based on a result of the sampling.

In another preferable application of the print control apparatus of the above embodiment, in response to specification of the image represented by the expanded image data as the print object image, the preprocessing management module instructs the preprocessing execution module to perform sampling of predetermined pixels from the expanded image data in advance prior to display of the preview image, and to set the correction parameter based on a result of the advanced sampling.

The invention is not restricted to the print control apparatus described above but is also actualized by an image processing apparatus. The technique of the invention may be actualized by diversity of other applications including a corresponding print control method and a corresponding image processing method. Any of the additional characteristics described above with regard to the print control apparatus may be applied to the image processing apparatus, as well as to the print control method and the image processing method. Other possible applications of the invention include computer programs for actualizing these apparatuses or the corresponding methods, recording media in which such computer programs are recorded, and data signals that include such computer programs and are embodied in carrier waves. Any of the additional characteristics described above may be adopted in any of these other applications.

In the applications of the invention as the computer programs and the recording media in which the computer programs are recorded, the invention may be given as a whole program to control the operations of the print control apparatus or the operations of the image processing apparatus or as a partial program to exert only the characteristic functions of the invention. Available examples of the recording media include flexible disks, CD-ROMs, DVD-ROMs, magneto-optical disks, IC cards, ROM cartridges, punched cards, prints with barcodes or other codes printed thereon, internal storage devices (memories like RAMs and ROMs) and external storage devices of the computer, and diversity of other computer readable media.

DESCRIPTION OF THE PREFERRED EMBODIMENTS

One mode carrying out the invention is described below in the following sequence as a preferred embodiment with reference to the accompanied drawings:
A. Embodiment
A1. Configuration and General Operations of Print Control Apparatus
A2. Print Object Image Specification Process
A3. Preprocessing Management Process
A4. Concrete Example of Advanced Implementation of Preprocessing
A5. Effects of Embodiment
B. Modifications

A. EMBODIMENT

A1. Configuration and General Operations of Print Control Apparatus

Figure 1:
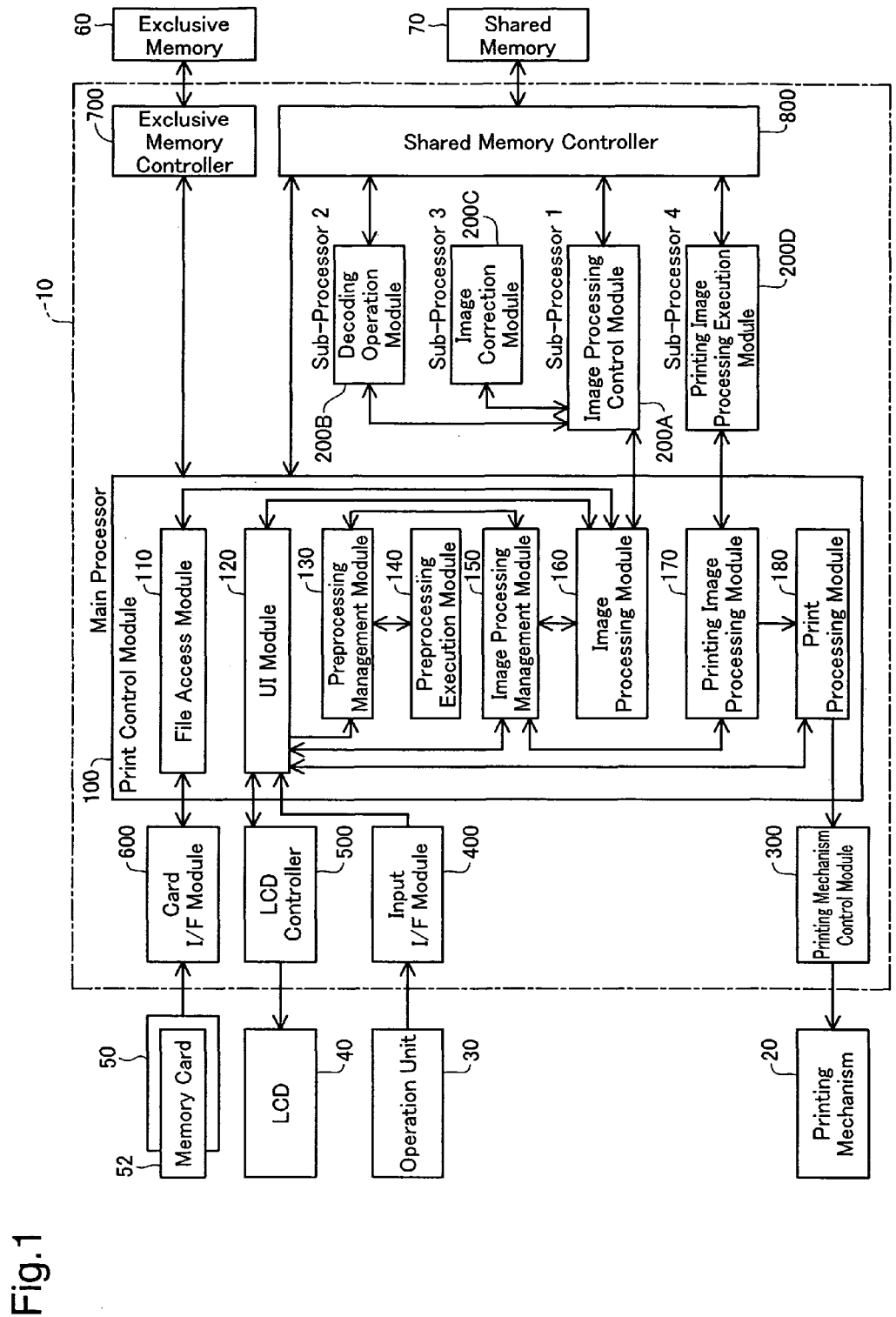
FIG. 1 is a functional block diagram showing the configuration of a print control apparatus in one embodiment of the invention.

FIG. 1 is a functional block diagram showing the configuration of a print control apparatus 10 in one embodiment of the invention. The print control apparatus 10 is a microprocessor having multi-processor system integrated on one semiconductor substrate. Each of multiple processors represents a unit having a CPU, a memory, a bus controller, and other peripheral circuits. In the structure of this embodiment shown in FIG. 1, the print control apparatus 10 includes one main processor 100 and four sub-processors 200A through 200D ('sub-processor 1' through 'sub-processor 4' in the illustration). The print control apparatus 10 also includes various peripheral circuits, in addition to the multiple processors 100 and 200A through 200D. The peripheral circuits include a printing mechanism control module 300 constructed as a circuit for controlling the operations of a printing mechanism 20, an input I/F module 400 constructed as a circuit for controlling the input operations of an operation unit 30, an LCD controller 500 for controlling the display operations on a liquid crystal panel (LCD) 40 as a display device, a card I/F module 600 constructed as a circuit for controlling the data reading operations from a memory card 52 inserted in a card slot 50, an exclusive memory controller 700 for controlling accesses from the main processor 100 to an exclusive memory 60, and a shared memory controller 800 for controlling accesses from the respective processors 100 and 200A through 200D to a shared memory 70. Peripheral circuits irrelevant to the characteristic of the invention are omitted from the system configuration shown in FIG. 1.

The multiple processors integrated to the print control apparatus 10 read and execute predetermined programs for the respective processors stored in the exclusive memory 60 to work as corresponding functional blocks. The main processor 100 reads and executes a specific program for the main processor 100 stored in the exclusive memory 60 to work as a corresponding functional block described below. Relevant programs for the respective sub-processors 200A through 200D are read from the exclusive memory 60 and are stored in the shared memory 70, while the main processor 100 reads the specific program for the main processor 100 from the exclusive memory 60. The sub-processors 200A through 200D respectively read and execute the relevant programs stored in the shared memory 70 to work as corresponding functional blocks described below.

The main processor 100 works as a functional block (print control module) for controlling the overall printing-related operations. In the description hereafter, the main processor 100 is also called the 'print control module 100'.

The print control module 100 has functional blocks of a file access module 110, a user interface module (UI module) 120, a preprocessing management module 130, a preprocessing execution module 140, an image processing management module 150, an image processing module 160, a printing image processing module 170, and a print processing module 180.

The file access module 110 controls the read-out operation of photo image data stored in the memory card 52.

The UI module 120 opens a selection window on the LCD 40 to allow the user's selection of each desired photo image to be printed as a print object image. In response to the user's operation of the operation unit 30, the UI module 120 displays available photo images, which are stored as photo image data in the memory card 52, on the selection window open on the LCD 40. When the user manipulates the operation unit 30 to set the required number of prints of a photo image currently displayed on the open selection window, the UI module 120 specifies the currently displayed photo image as a print object image. After specification of the print object image, the UI module 120 sends a request for advanced implementation of preprocessing (hereafter referred to as 'advanced preprocessing request') with regard to the specified print object image to the preprocessing management module 130. In response to the user's operation of the operation unit 30 to give a print start instruction, the UI module 120 sends an image processing request with regard to the specified print object image to the image processing management module 150 to trigger a series of image processing required for printing. The UI module 120 of the embodiment is equivalent to the print object image specification module of the invention.

The preprocessing management module 130 receives the advanced preprocessing request from the UI module 120 and sends a preprocessing command to the preprocessing execution module 140 to implement the required preprocessing as described later.

The preprocessing execution module 140 receives the preprocessing command from the preprocessing management module 130 and performs the required preprocessing to set correction parameters used for image correction in the course of image processing as described later. The preprocessing of this embodiment includes at least one of a statistical process to determine a maximum luminance, a minimum luminance, an average luminance, and a median luminance as characteristic amounts representing the characteristics of a print object image, a face recognition process to identify the presence of any human face in the print object image, and a red-eye reduction process to reduce and correct the red eye in the print object image. In the structure of this embodiment, the preprocessing execution module 140 performs all the statistical process, the face recognition process, and the red-eye analysis process. The conventional preprocessing samples print object image data at a preset proportion and executes the statistical process and the face recognition process based on a histogram created according to the sampled print object image data. The preprocessing of this embodiment thus includes this sampling operation.

The image processing management module 150 receives the image processing request with regard to the specified print object image from the UI module 120 and sends a request for implementation of preprocessing (hereafter referred to as 'preprocessing request') with regard to the specified print object image to the preprocessing management module 130. In response to reception of a preprocessing completion notification from the preprocessing management module 130, the image processing management module 150 sends an image processing command to the image processing module 160 and controls a series of image processing executed by the image processing module 160.

When the required preprocessing has been implemented in advance prior to the user's print start instruction, the preprocessing management module 130 immediately sends back the preprocessing completion notification in response to reception of the preprocessing request. Namely only a very short time is required for preprocessing in the course of printing.

The photo image data stored in the memory card 52 are, for example, compressed data in a JPEG format. The image processing module 160 accordingly executes a decoding operation as one of required image processing operations to expand the photo image data of the specified print object image (hereafter referred to as the print object image data) read from the memory card 52 into image data in an RGB format.

In addition to the decoding operation, the image processing module 160 performs an image correction operation with regard to original image data or expanded image data, which is obtained by expansion of the print object image data. The image correction operation implements at least one of image corrections with the correction parameters set by the preprocessing, for example, color correction, brightness correction, contrast correction, saturation correction, noise elimination, smoothing, and contour correction. The image processing module 160 also performs a resolution conversion process to convert the resolution of the print object image data and a layout process to generate layout image data for specifying arrangement of an image represented by the print object image data at an actual printing position on a printing medium.

The image processing module 160 does not actually implement the series of image processing described above but gives an instruction for implementation of a required operation to the first sub-processor 200A functioning as the image processing control module. In response to reception of the instruction for implementation of the required operation, the first sub-processor 200A controls a relevant one of the first sub-processor 200A through the third sub-processor 200C to actually implement the required operation specified by the instruction.

Under management of the image processing management module 150, the printing image processing module 170 generates printing image data based on the image data processed by the image processing module 160. The printing image data is used for actual printing of a resulting image on a printing medium. For example, in an inkjet printing apparatus, the printing image data is binary data representing arrangement of dots on a printing medium. Like the image processing module 160, the printing image processing module 170 does not actually generate the printing image data but gives an instruction for generation of printing image data to the fourth sub-processor 200D functioning as the printing image processing execution module. In response to reception of the instruction for generation of printing image data, the fourth sub-processor 200D actually generates printing image data.

The print processing module 180 controls the printing mechanism 20 via the printing mechanism control module 300 according to the printing image data generated by the printing image processing module 170 to implement an actual printing operation.

The first sub-processor 200A works as a functional block of image processing control module to control the required image processing operation in response to the instruction from the image processing module 160. In the description hereafter, the first sub-processor 200A is also called the 'image processing control module 200A'.

The second sub-processor 200B works as a functional block of decoding operation module or image expansion module to execute the decoding operation or image expansion operation of decoding image data in the JPEG format, in response to a control command from the image processing control module 200A. In the description hereafter, the second sub-processor 200B is also called the 'decoding operation module 200B'.

The decoding operation module 200B actually performs the decoding operation, in response to a decoding command given from the image processing module 160 via the image processing control module 200A.

The third sub-processor 200C works as a functional block of image correction module to execute the image correction operation, in response to a control command from the image processing control module 200A as described later in detail. In the description hereafter, the third sub-processor 200C is also called the 'image correction module 200C'.

The fourth sub-processor 200D works as a functional block of printing image processing execution module to generate printing image data according to the image data processed by the image processing module 160. In the description hereafter, the fourth sub-processor 200D is also called the 'printing image processing execution module 200D'.

In the structure of the embodiment, the UI module 120 sends the advanced preprocessing request to the preprocessing management module 130 in response to the user's specification of a print object image, before the preprocessing request is given from the image processing management module 150 to the preprocessing management module 130. The preprocessing management module 130 accordingly starts the required preprocessing, prior to the user's print start instruction. This is the main characteristic of the invention. The following description sequentially regards the details of the print object image specification process and the preprocessing management process related to the advanced implementation of required preprocessing. A concrete example of the advanced implementation of required preprocessing is then described in detail.

A2. Print Object Image Specification Process

Figure 2:
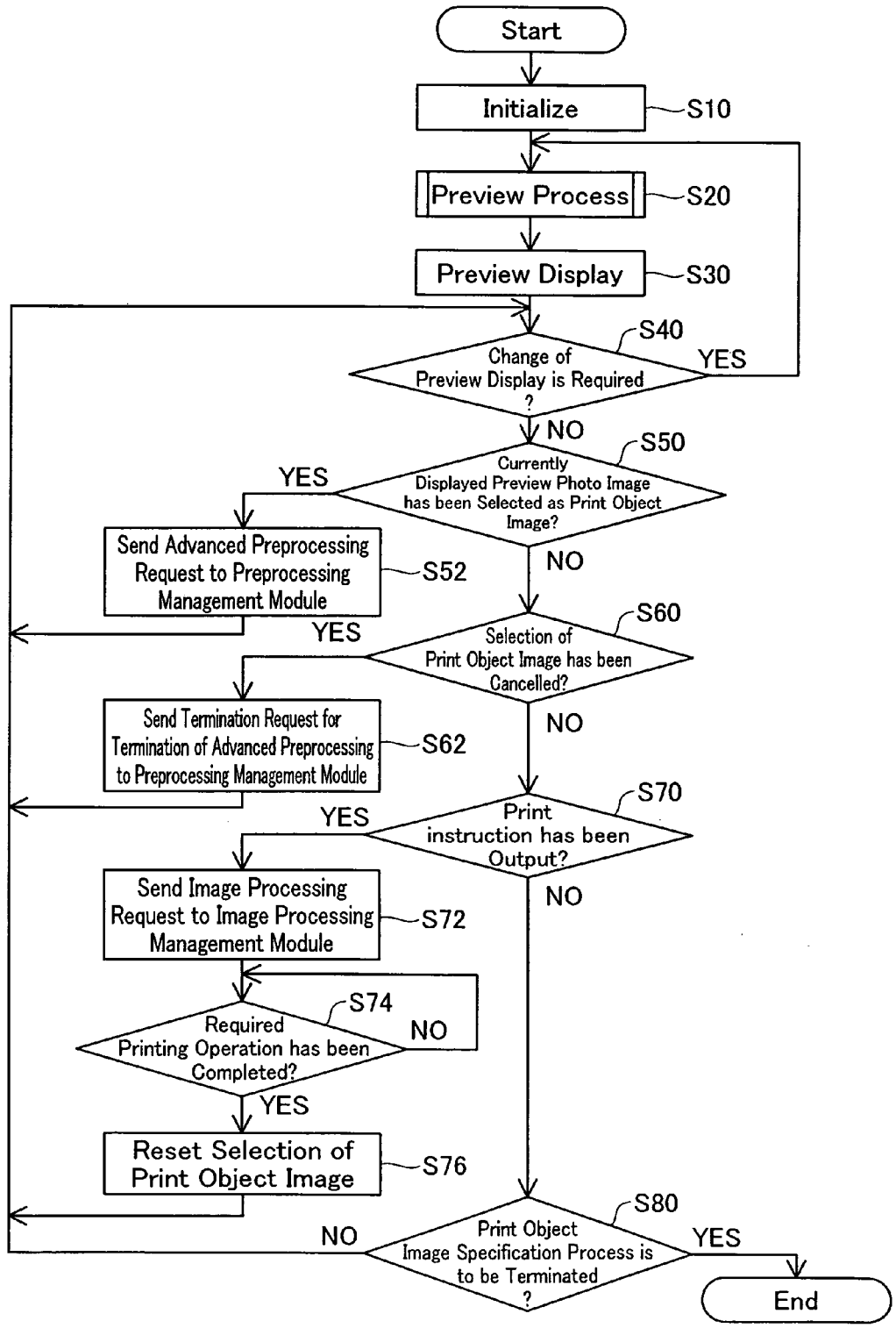
FIG. 2 is a flowchart showing a print object image specification process performed by a UI module of a main processor included in the print control apparatus of the embodiment.

FIG. 2 is a flowchart showing a print object image specification process performed by the UI module 120. The print object image specification process is triggered by, for example, the user's operation of the operation unit 30 to select an option for printing an image stored in the memory card 52 on a menu window open on the LCD 40.

In the print object image specification process of FIG. 2, the UI module 120 first performs a predetermined initialization process at step S10. For example, the UI module 120 retrieves photo image data stored in the memory card 52 via the file access module 110, creates a list of image files rearranged in the alphabetical order of image file names, and stores the created list in the exclusive memory 60. The photo image data stored in the memory card 52 are afterward handled in the rearranged alphabetical order of image file names. For example, when four photo image data having image file names 'A', 'B', 'C', and 'D' are stored in the memory card 52, preview photo images of these four photo image data are displayed in the alphabetical order of the image file names 'A', 'B', 'C', and 'D'. Even when the preview photo images of the photo image data stored in the memory card 52 are specified as the print object images in the order of the image file names 'D', 'C', 'B', and 'A', the specified print object images are printed in the rearranged alphabetical order of the image file names 'A', 'B', 'C', and 'D'.

At step S20, the UI module 120 performs a preview process with regard to first photo image data in the alphabetical order. For example, when the four photo image data having the image file names 'A', 'B', 'C', and 'D' are stored in the memory card 52, the preview process is performed with regard to the first photo image data having the image file name 'A'.

Figure 3:
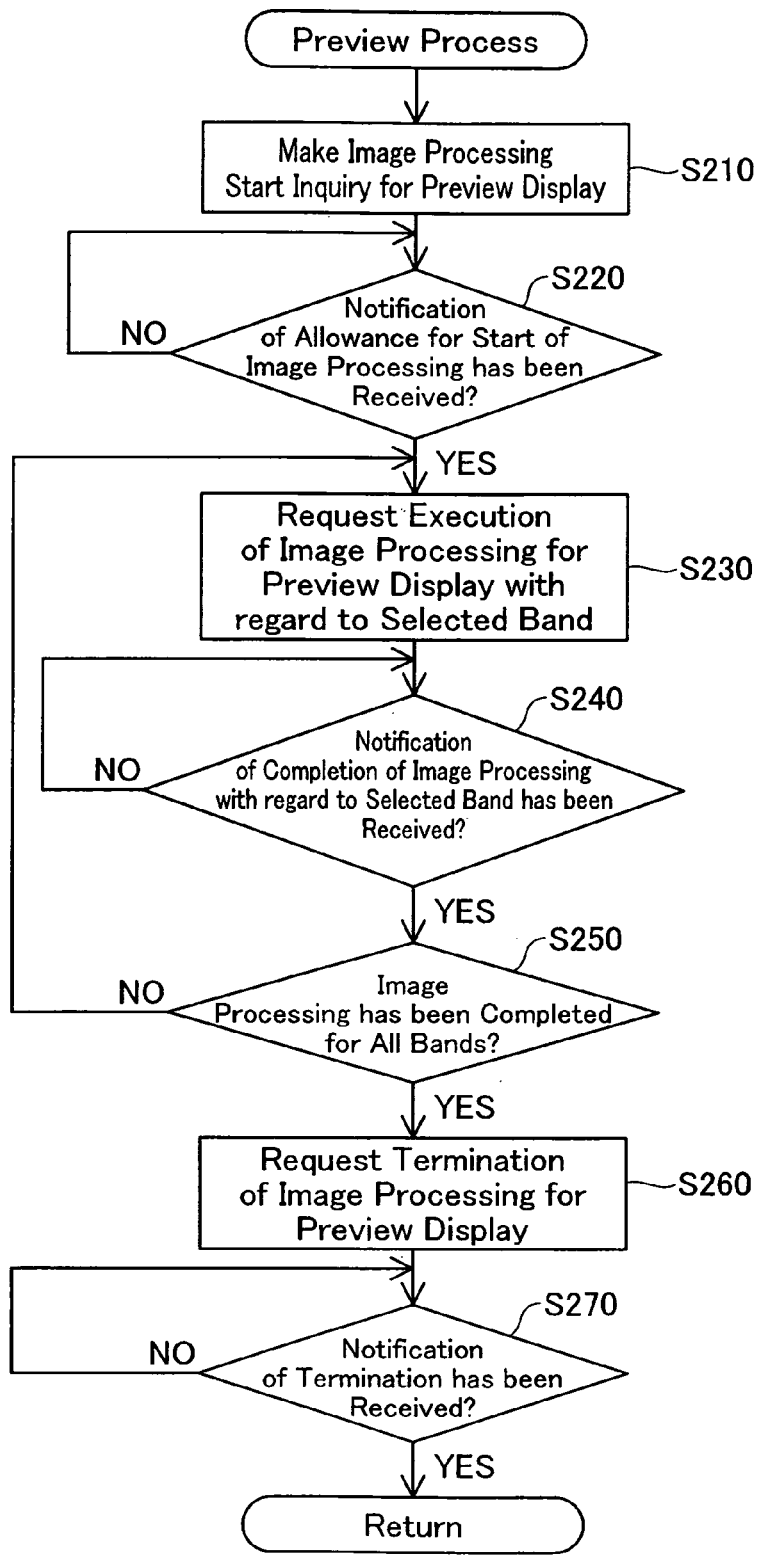
FIG. 3 is a flowchart showing the details of the preview process executed at step S20 in the print object image specification process of FIG. 2.

FIG. 3 is a flowchart showing the details of the preview process executed at step S20 in the print object image specification process of FIG. 2.

In the preview process of FIG. 3, the UI module 120 makes an image processing start inquiry for preview display to the image processing module 160 at step S210 and identifies whether the image processing module 160 is available for start of a required series of image processing for preview display.

At step S220, the UI module 120 waits until reception of a notification of allowance for start of image processing (start allowance notification) from the image processing module 160 as a response to the image processing start inquiry. Reception of the start allowance notification gives an affirmative answer at step S220 and activates the processing of step S230.

The UI module 120 requests the image processing module 160 to execute required image processing for preview display at step S230. The photo image data specified as the print object image is divided into multiple blocks (bands). The image processing is generally performed in the units of blocks (bands). The request for image processing is accordingly made with regard to each selected band at step S230.

The image processing module 160 gives an instruction for a decoding operation with regard to the selected band of the photo image data as the object of preview display to the decoding operation module 200B via the image processing control module 200A. The decoding operation module 200B performs the required decoding operation on the selected band of the photo image data, in response to the instruction from the image processing control module 200A.

The UI module 120 waits until reception of a notification of completion of the required image processing on the selected band from the decoding operation module 200B via the image processing control module 200A at step S240. The preview process goes to step S250 on reception of the notification of completion of the required image processing on the selected band (step S240: yes).

At step S250, it is determined whether the required image processing for preview display has been completed with regard to all the bands of the photo image data as the object of preview display. When there is any unprocessed band (step S250: no), the preview process goes back to step S230 to make the request for execution of the required image processing for preview display with regard to the unprocessed band. On completion of the required image processing for all the bands (step S250: yes), on the other hand, the preview process goes to step S260. The processing of steps S230 to step S250 is repeated until completion of the required image processing with regard to all the bands.

The UI module 120 requests the image processing module 160 to terminate the image processing for preview display at step S260.

The UI module 120 then waits until reception of a notification of termination from the image processing module 160 as a response to the termination request at step S270. On reception of the notification of termination (step S270: yes), the UI module 120 exits from the preview process of FIG. 3 and proceeds to step S30 in the print object image specification process of FIG. 2.

Figure 4:
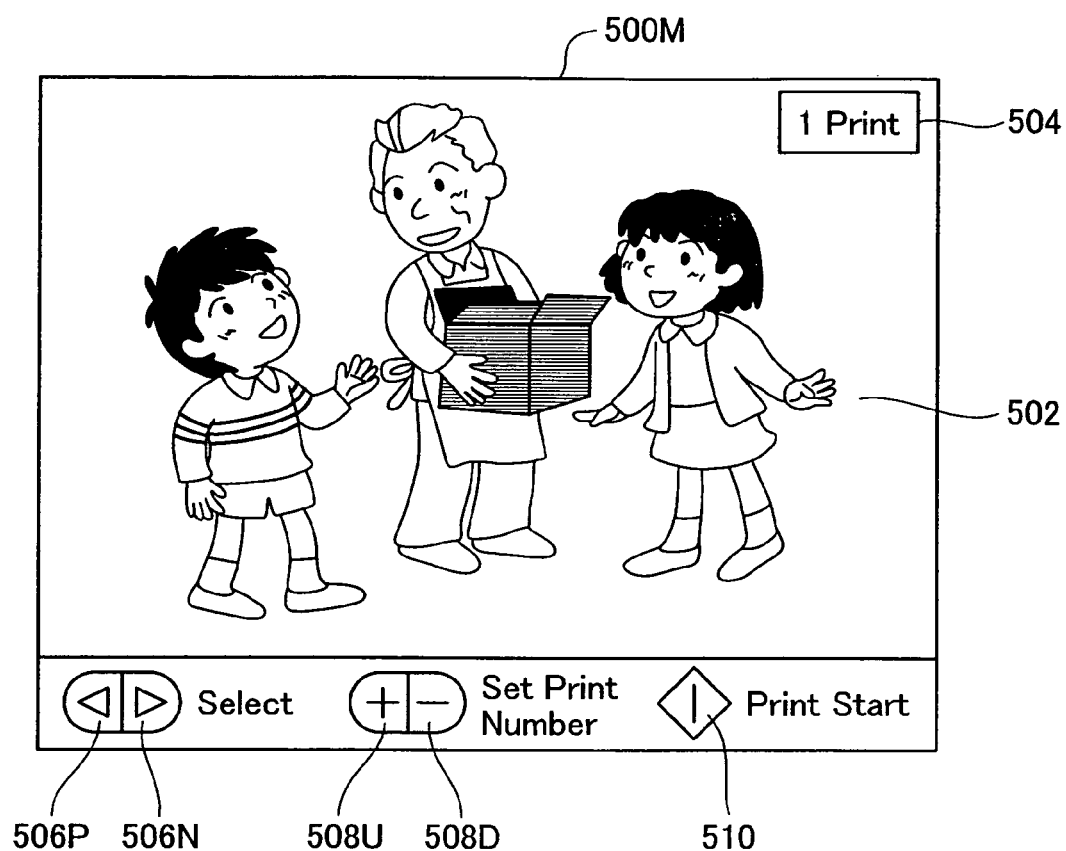
FIG. 4 shows a preview photo image displayed on an LCD.

A preview photo image represented by the photo image data expanded by the preview process is displayed on the LCD 40 at step S30. FIG. 4 shows a preview photo image displayed on the LCD 40. In the example of FIG. 4, a selection window 500M is opened on the LCD 40 to allow the user's selection of a desired photo image (photograph) as an object of printing. The preview photo image represented by the preview-processed photo image data is displayed in a preview display field 502 in the selection window 500M.

The UI module 120 repeats the decisions of steps S40, S50, S60, and S70 until termination of the print object image specification process is required (step S80: yes).

It is determined at step S40 whether a change of the preview display of the photo image is required. When the user operates selection buttons 506P and 506N on the selection window 500M of FIG. 4 to change the preview display from the currently displayed photo image to a prior photo image or a later photo image, the affirmative answer is given at step S40 to identify the requirement for change of the preview display of the photo image. The selection buttons 506P and 506N are provided as buttons of the operation unit 30. The selection button 506P is operated to select a prior photo image, and the selection button 506N is operated to select a later photo image.

On requirement for the change of the preview display of the photo image (step S40: yes), the print object image specification process goes back to step S20 to execute the preview process of the newly selected photo image and proceeds to step S30 to display a preview photo image of the preview-processed photo image data. On no requirement for the change of the preview display of the photo image (step S40: no), on the other hand, the print object image specification process proceeds to the decision of step S50.

It is determined at step S50 whether the currently displayed preview photo image has been selected as a print object image. When the user operates print number setting buttons 508U and 508D on the selection window 500M of FIG. 4 to set 1 or a greater number to the required number of prints, the affirmative answer is given at step S50 to identify selection of the currently displayed preview photo image as the print object image. The print number setting buttons 508U and 508D are provided as buttons of the operation unit 30. The print number setting button 508U is operated to increase the required number of prints, and the print number setting button 508D is operated to decrease the required number of prints. The set number of prints is shown in a print number display box 504 on the selection window 500M.

On selection of the currently displayed preview photo image as the print object image (step S50: yes), the print object image specification process proceeds to step S52. On no selection of the currently displayed preview photo image as the print object image (step S50: no), on the other hand, the print object image specification process goes to the decision of step S60.

The UI module 120 specifies photo image data of the selected print object image as print object image data and sends an advanced preprocessing request of the specified print object image data to the preprocessing management module 130 at step S52. The print object image specification process then returns to step S40 and repeats the decisions of steps S40 to S80.

It is determined at step S60 whether selection of the currently displayed preview photo image as the print object image has been cancelled out. When the user operates the print number setting buttons 508U and 508D to reset the required number of prints to 0, the affirmative answer is given at step S60 to identify cancellation of the selection as the print object image.

On cancellation of the selection as the print object image (step S60: yes), the print object image specification process proceeds to step S62. On no cancellation of the selection as the print object image (step S60: no), on the other hand, the print object image specification process goes to the decision of step S70.

The UI module 120 sends a termination request for terminating the advanced preprocessing of the print object image data as the subject of the cancelled selection at step S62. The print object image specification process then returns to step S40 and repeats the decisions of steps S40 to S80.

It is determined at step S70 whether a print start instruction has been given to print the selected print object image. When the user operates a print start button 510 on the selection window 500M of FIG. 4, the affirmative answer is given at step S70 to identify the presence of the print start instruction. The print start button 510 is provided as a button of the operation unit 30.

In the presence of the print start instruction (step S70: Yes), the print object image specification process executes the processing of steps S72 to S76. The print object image specification process then returns to step S40 and repeats the decisions of steps S40 to S80. In the absence of the print start instruction (step S70: no), on the other hand, the print object image specification process goes to the decision of step S80.

At step S72, the UI module 120 sends an image processing request for printing the selected print object image to the image processing management module 150.

At step S74, the UI module 120 receives a notification of completion of the required image processing as a response to the image processing request and waits until completion of a required printing operation. On completion of the required printing operation (step S74: yes), the print object image specification process goes to step S76.

At step S76, the selection of the print object image is reset.

It is determined at step S80 whether execution of the print object image specification process by the UI module 120 is to be terminated. When the user operates a preset processing termination button of the operation unit 30, the affirmative answer is given at step S80 to identify requirement for termination of the print object image specification process.

A3. Preprocessing Management Process

Figure 5:
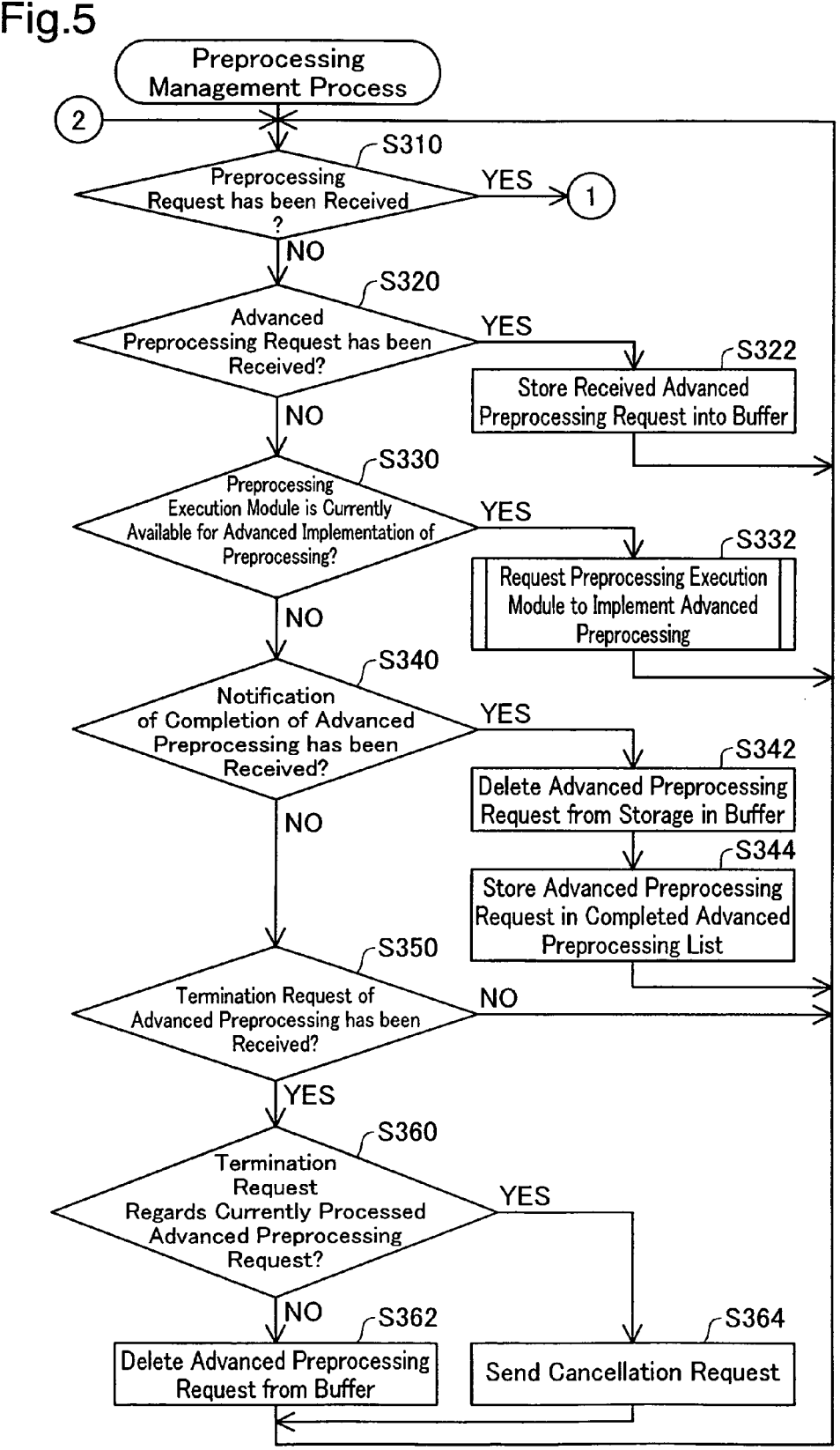
FIG. 5 is a flowchart showing a preprocessing management process executed by a preprocessing management module of the main processor.
Figure 6:
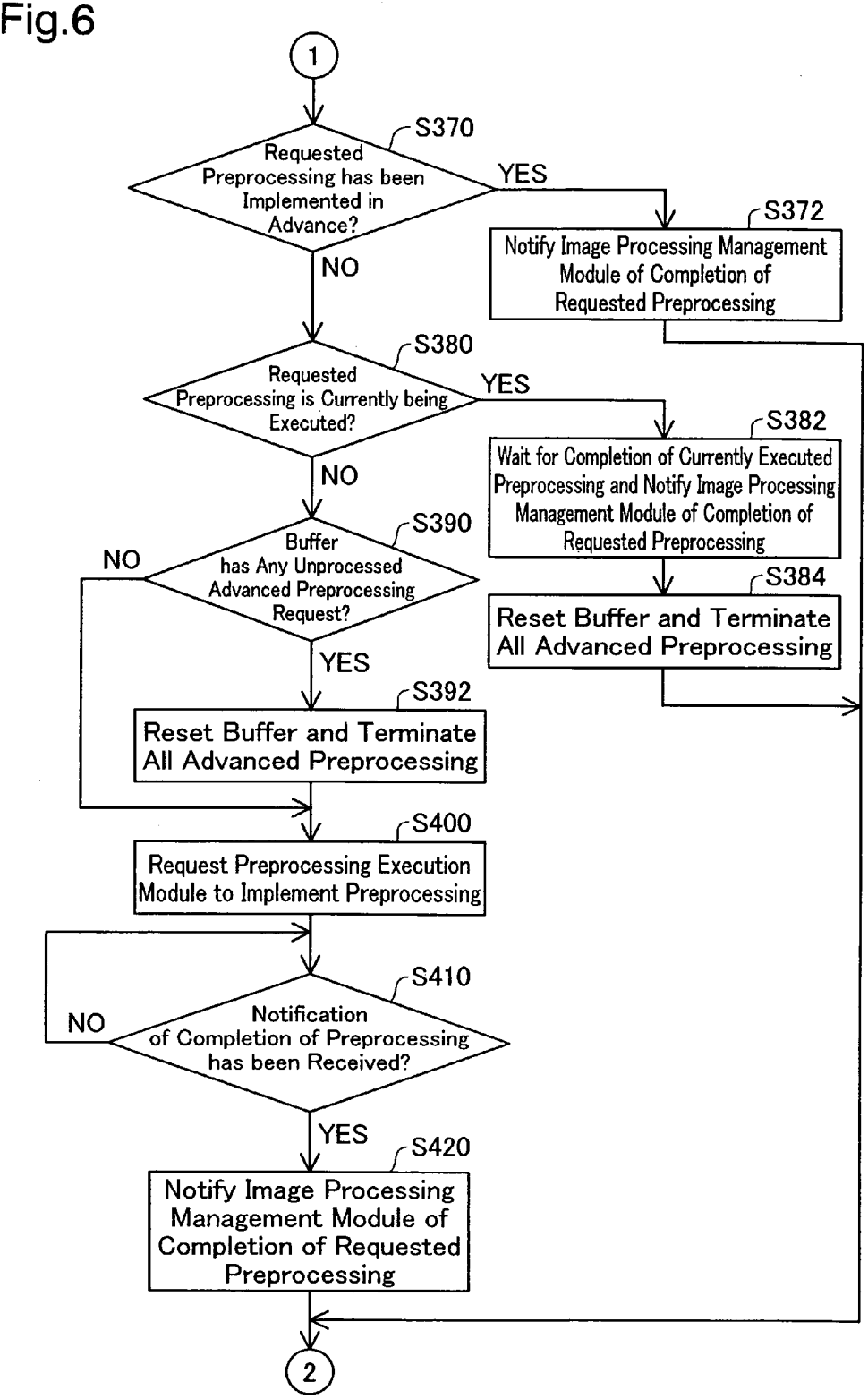
FIG. 6 is a flowchart showing the preprocessing management process executed by a preprocessing management module of the main processor.

FIGS. 5 and 6 are the flowcharts showing a preprocessing management process executed by the preprocessing management module 130.

The preprocessing management module 130 repeats the decisions of steps S310, S320, S330, S340, S350, and S360.

It is determined at step S310 whether the preprocessing management module 130 has received a preprocessing request from the image processing management module 150 after the start of printing. On reception of the preprocessing request (step S310: yes), the preprocessing management process executes the processing of steps S370 to S410. On no reception of the preprocessing request (step S310: no), on the other hand, the preprocessing management process goes to the decision of step S320. The processing of steps S370 to S410 will be described below.

It is determined at step S320 whether the preprocessing management module 130 has received an advanced preprocessing request from the UI module 120. On reception of the advanced preprocessing request (step S320: yes), the preprocessing management process goes to step S322. On no reception of the advanced preprocessing request (step S320: no), on the other hand, the preprocessing management process goes to the decision of step S330.

At step S322, the preprocessing management module 130 stores the received advanced preprocessing request into an advanced preprocessing request buffer set in the exclusive memory 60 and goes back to step S310 to repeat the decisions of steps S310 to S350.

It is determined at step S330 whether the preprocessing execution module 140 is currently available for advanced implementation of preprocessing. When there is any advanced preprocessing request for which the notification of completion has not yet been sent from the preprocessing execution module 140, the preprocessing execution module 140 is expected to be currently performing the advanced preprocessing in response to the prior advanced preprocessing request. In this case, it is determined at step S330 that the preprocessing execution module 140 is currently unavailable for advanced implementation of preprocessing.

On identification of the current availability of the preprocessing execution module 140 for advanced implementation of preprocessing (step S330: yes), the preprocessing management process goes to step S332. On identification of the current unavailability of the preprocessing execution module 140 for advanced implementation of preprocessing (step S330: no), on the other hand, the preprocessing management process goes to the decision of step S340.

Figure 7:
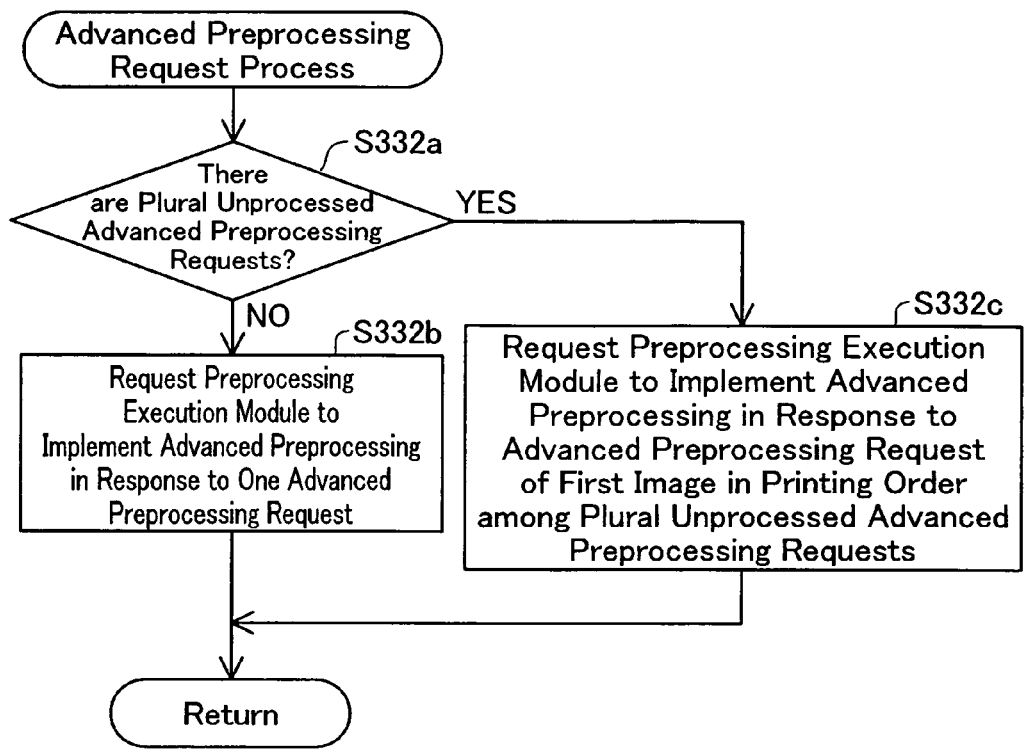
FIG. 7 is a flowchart showing an advanced preprocessing request process.

At step S332, the preprocessing management module 130 requests the preprocessing execution module 140 to implement the advanced preprocessing. FIG. 7 is a flowchart showing the details of the advanced preprocessing request process.

The preprocessing management module 130 first determines whether there are plural unprocessed advanced preprocessing requests at step S332a. According to a concrete procedure, the preprocessing management module 130 checks the advanced preprocessing request buffer for storage of plural unprocessed advanced preprocessing requests.

When there is only one unprocessed advanced preprocessing request stored in the advanced preprocessing request buffer (step S332a: no), the preprocessing management module 130 requests the preprocessing execution module 140 to implement the advanced preprocessing in response to the advanced preprocessing request at step S332b. When there are plural unprocessed advanced preprocessing requests stored in the advanced preprocessing request buffer (step S332a: yes), on the other hand, the preprocessing management module 130 requests the preprocessing execution module 140 to implement the advanced preprocessing in response to an advanced preprocessing request of a first image in the printing order rearranged by the initialization process (step S10 in the flowchart of FIG. 2) among the plural unprocessed advanced preprocessing requests at step S332c. After the request of the advanced preprocessing, the preprocessing management process goes back to step S310 to repeat the decisions of steps S310 to S350.

It is determined at step S340 whether the preprocessing management module 130 has received a notification of completion of the advanced preprocessing in response to the advanced preprocessing request from the preprocessing execution module 140. On reception of the notification of completion of the advanced preprocessing (step S340: yes), the preprocessing management process executes the processing of steps S342 and S344 and goes back to step S310 to repeat the decisions of steps S310 to S350. On no reception of the notification of completion of the advanced preprocessing (step S340: no), on the other hand, the preprocessing management process goes to the decision of step S350.

At step S342, the preprocessing management module 130 deletes the advanced preprocessing request, for which the notification of completion of the advanced processing has been received from the preprocessing execution module 140, from the storage in the advanced preprocessing request buffer. At step S344, the preprocessing management module 130 stores the deleted advanced preprocessing request in a completed advanced preprocessing list created in the exclusive memory 60. The preprocessing management process then goes back to step S310 to repeat the decisions of steps S310 to S350.

It is determined at step S350 whether the preprocessing management module 130 has received a termination request for termination of the advanced preprocessing from the UI module 120. On no reception of the termination request for termination of the advanced preprocessing (step S350: no), the preprocessing management process goes back to step S310 to repeat the decisions of steps S310 to S350. On reception of the termination request for termination of the advanced preprocessing (step S350: yes), on the other hand, the preprocessing management process goes to the decision of step S360.

It is determined at step S360 whether the received termination request for termination of the advanced preprocessing regards the advanced preprocessing request currently processed by the preprocessing execution module 140. When the received termination request regards the currently processed advanced preprocessing request (step S360: yes), the preprocessing management module 130 sends a cancellation request for cancellation of the currently processed advanced preprocessing request to the preprocessing execution module 140 at step S364. When the received termination request does not regard the currently processed advanced preprocessing request but regards an unprocessed advanced preprocessing request (step S360: no), on the other hand, the preprocessing management module 130 deletes the unprocessed advanced preprocessing request from the stored in the advanced preprocessing request buffer at step S362. The preprocessing management process then goes back to step S310 to repeat the decisions of steps S310 to S350.

The preprocessing management module 130 manages the advanced implementation of preprocessing according to this preprocessing management flow.

As mentioned previously, when the preprocessing management module 130 has received a preprocessing request from the image processing management module 150 after the start of printing (step S310: yes), the preprocessing management process executes the processing of steps S370 to S410.

It is determined at step S370 whether the preprocessing specified by the received preprocessing request has already been implemented in advance by the preprocessing execution module 140. In the case of advanced implementation of the requested preprocessing (step S370: yes), the preprocessing management process goes to step S372. In the case of no advanced implementation of the requested preprocessing (step S370: no), on the other hand, the preprocessing management process goes to the decision of step S380.

At step S372, the preprocessing management module 130 immediately notifies the image processing management module 150 of completion of the requested preprocessing. The preprocessing management process then goes back to step S310 to repeat the decisions of steps S310 to S350.

It is determined at step S380 whether the preprocessing specified by the received preprocessing request is currently being executed by the preprocessing execution module 140. In the case of current execution of the requested preprocessing (step S380: yes), the preprocessing management process executes the processing of steps S382 and S384. In the case of no current execution of the requested preprocessing (step S380: no), on the other hand, the preprocessing management process goes to the decision of step S390.

At step S382, the preprocessing management module 130 waits for completion of the currently executed preprocessing and notifies the image processing management module 150 of completion of the requested preprocessing. At step S384, the preprocessing management module 130 resets the storage of the advanced preprocessing request buffer and terminates all the advanced preprocessing. The preprocessing management process then goes back to step S310 to repeat the decisions of steps S310 to S350.

It is determined at step S390 whether the advanced preprocessing request buffer has any unprocessed advanced preprocessing request. In the case of storage of any unprocessed advanced preprocessing request (step S390: yes), the preprocessing management process executes the processing of step S392 and then goes to step S400. In the case of storage of no unprocessed advanced preprocessing request (step S390: no), on the other hand, the preprocessing management process immediately goes to step S400.

At step S392, the preprocessing management module 130 resets the storage of the advanced preprocessing request buffer and terminates all the advanced preprocessing.

At step S400, the preprocessing management module 130 requests the preprocessing execution module 140 to implement the preprocessing, in response to the preprocessing request identified at step S310.

At step S410, the preprocessing management module 130 waits until reception of a notification of completion of the preprocessing from the preprocessing execution module 140.

On reception of the notification of completion of the preprocessing, the preprocessing management module 130 notifies the image processing management module 150 of completion of the requested preprocessing at step S420. The preprocessing management process then goes back to step S310 to repeat the decisions of steps S310 to S350.

A4. Concrete Example of Advanced Implementation of Preprocessing

Figure 8:
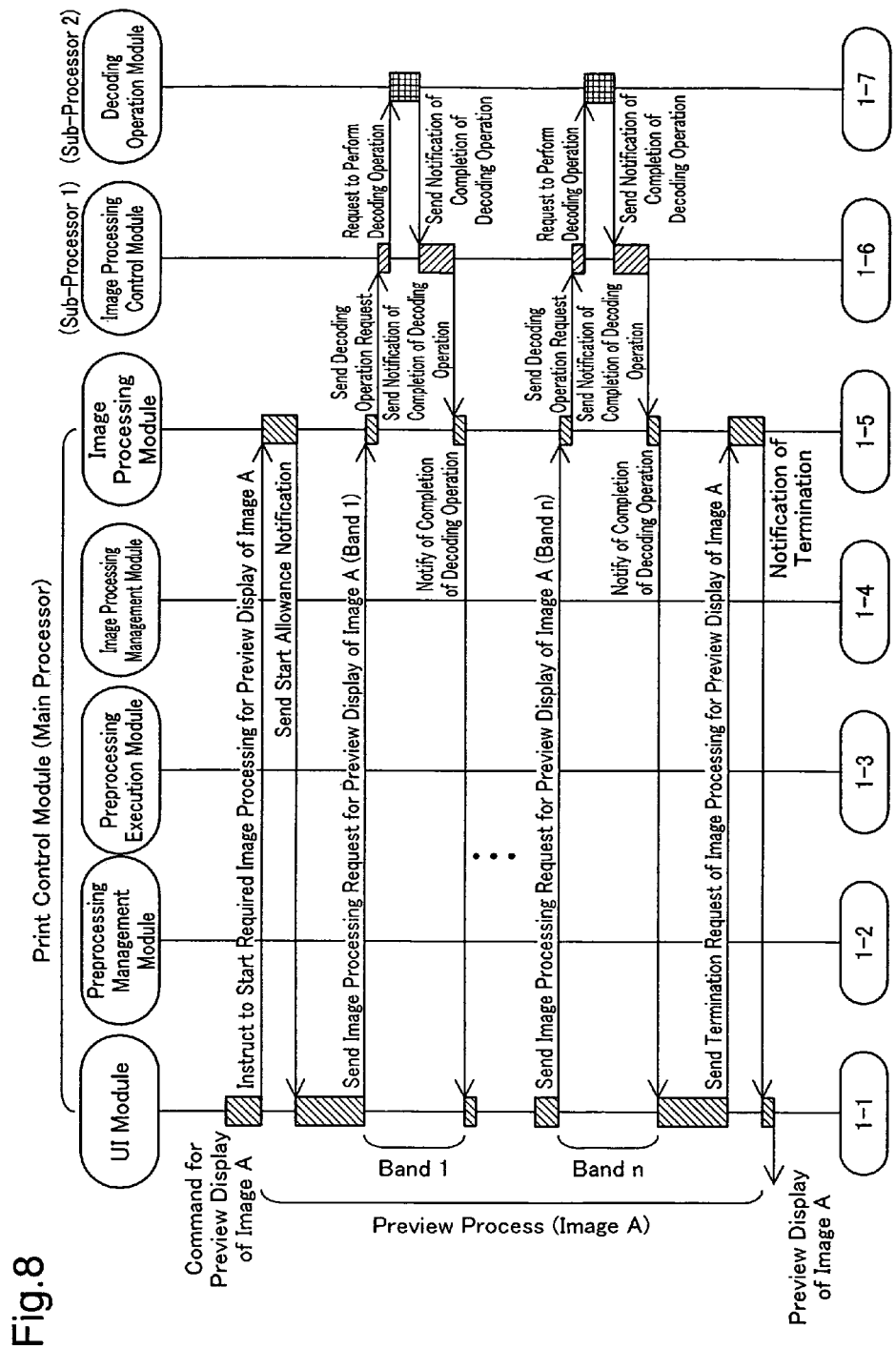
FIG. 8 shows a concrete example of advanced implementation of preprocessing.
Figure 9:
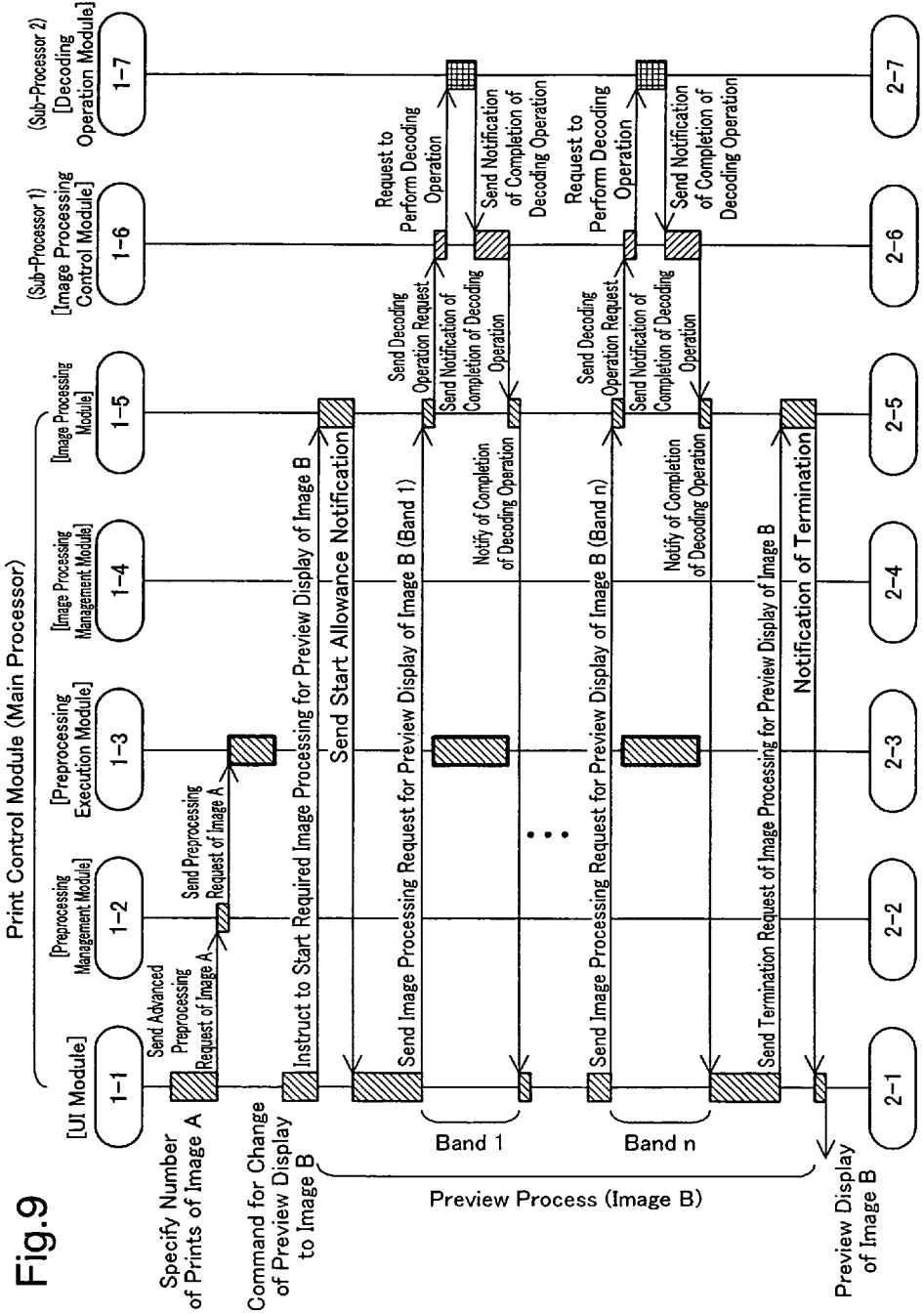
FIG. 9 shows the concrete example of advanced implementation of preprocessing.
Figure 10:
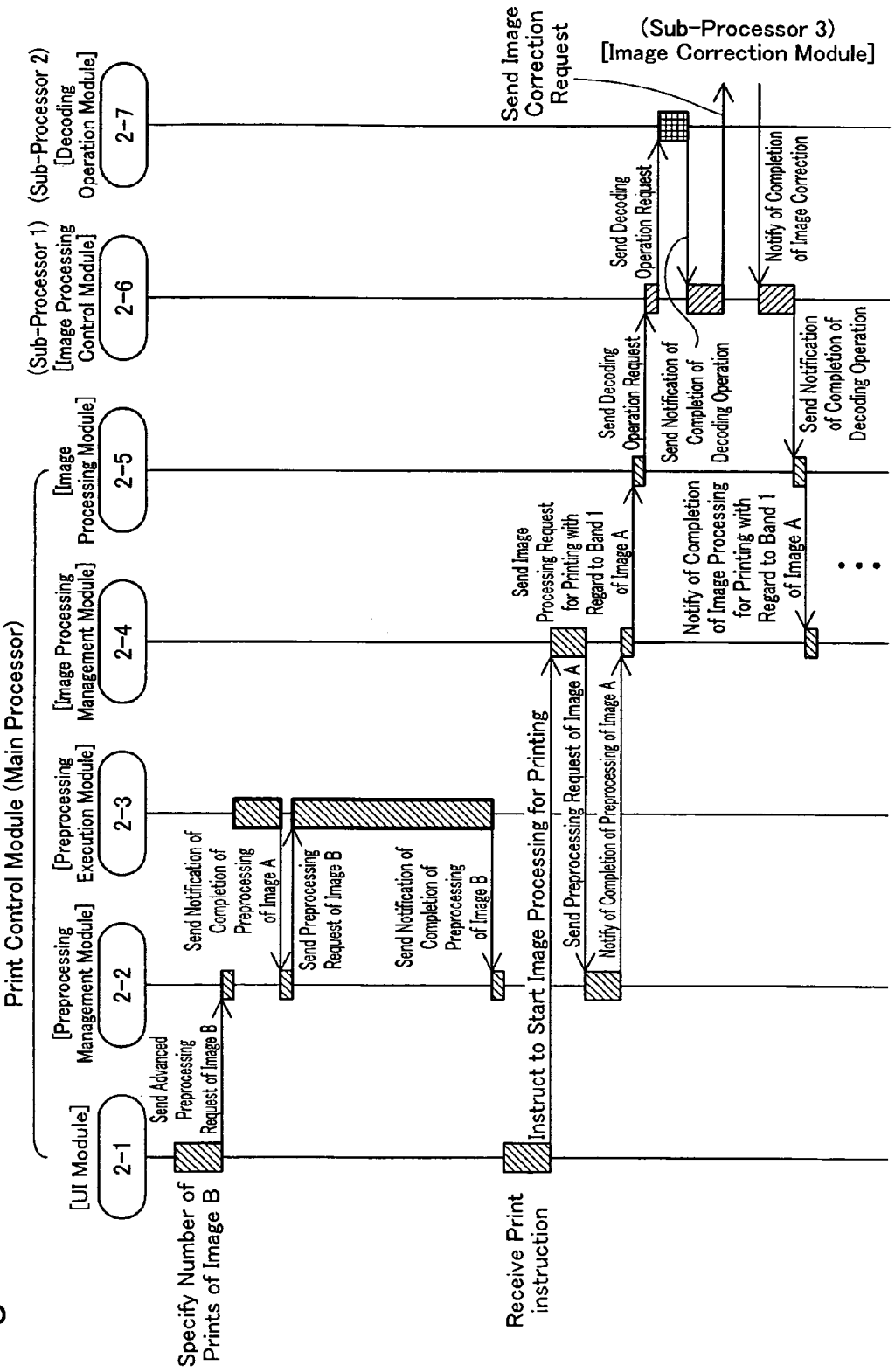
FIG. 10 shows the concrete example of advanced implementation of preprocessing.

FIGS. 8 through 10 show a concrete example of advanced implementation of preprocessing. This illustrated example selects two photo images, image A and image B, as print object images and starts printing of the selected two print object images A and B.

When the user operates the selection buttons 506P and 506N (see FIG. 4) to give a command for preview display of a selected image A, the UI module 120 instructs the image processing module 160 to start a required series of image processing for preview display of the selected image A.

When the image processing module 160 is currently available for a start of the required image processing, the image processing module 160 sends a start allowance notification to the UI module 120.

The UI module 120 receives the start allowance notification and starts the preview process. The preview process divides the selected image A into 'n' bands (where n is an integer of not less than 1) and performs the required image processing for each of the 'n' bands for preview display.

According to the concrete procedure, the UI module 120 first sends an image processing request to the image processing module 160 to perform the required image processing for preview display with regard to a band 1 of the selected image A. The image processing module 160 receives the image processing request and sends a decoding operation request via the image processing control module 200A to the decoding operation module 200B to perform the decoding operation. The decoding operation module 200B receives the decoding operation request and performs the decoding operation of the band 1 of the selected image A. On completion of the decoding operation, the decoding operation module 200B sends a notification of completion of the decoding operation to the image processing module 160 via the image processing control module 200A. The image processing module 160 receives the notification of completion of the decoding operation and notifies the UI module 120 of completion of the required image processing for preview display with regard to the band 1 of the selected image A.

The required image processing for preview display described above with regard to the band 1 of the selected image A is repeated until completion of the image processing for all the bands 'n' of the selected image A.

On completion of the image processing for preview display with regard to all the bands 'n' of the selected image A, the UI module 120 terminates the preview process and displays preview of the processed image A.

When the user operates the print number setting buttons 508U and 508D (see FIG. 4) to set 1 or a greater number to the required number of prints of the displayed preview image A, the UI module 120 specifies the displayed preview image A as a print object image and sends an advanced preprocessing request of the specified print object image A to the preprocessing management module 130.

The preprocessing management module 130 receives the advanced preprocessing request and sends a preprocessing request to the preprocessing execution module 140 to implement the required preprocessing of the specified print object image A.

The preprocessing execution module 140 receives the preprocessing request and starts the required preprocessing of the image A. The preprocessing of this embodiment requires the four processing operations, the sampling process of sampling the decoded image data to create a histogram, the statistical process of determining the characteristic amounts of the image, for example, the maximum luminance, the minimum luminance, the average luminance, and the median luminance, based on the created histogram, the face recognition process, and the red-eye reduction process.

When the user subsequently operates the selection buttons 506P and 506N (see FIG. 4) to give a command for preview display of a selected image B, the UI module 120 instructs the image processing module 160 to start the required series of image processing for preview display of the selected image B. The UI module 120 then performs the preview process according to the same procedure as that for the image A described above.

The preprocessing of the image A, which has started prior to the start of the preview process of the image B, requires the four processing operations as mentioned above. There is no trouble in the case where the command for preview display of the image B is given after completion of these four processing operations. When the command for preview display of the image B is given during execution of the four processing operations, however, the main processor 100 is required to perform the preview process of the image B in parallel to the preprocessing of the image A. In such cases, the user interface-related processing is generally preferential over the user interface-unrelated processing. In the structure of the embodiment, the preprocessing executed by the preprocessing execution module 140 has the lower priority than the processing executed by the other functional blocks. The preprocessing is thus performed in a vacant time when the other functional blocks of the main processor 100 are not activated as shown by the hatched rectangles surrounded by the thick solid lines in FIG. 9.

On termination of the preview process of the image B, the UI module 120 displays preview of the processed image B.

When the user operates the print number setting buttons 508U and 508D (see FIG. 4) to set 1 or a greater number to the required number of prints of the displayed preview image B, the UI module 120 specifies the displayed preview image B as a print object image and sends an advanced preprocessing request of the specified print object image B to the preprocessing management module 130.

The preprocessing execution module 140 is currently executing the preprocessing of the image A and has not yet sent a notification of completion of the preprocessing of the image A to the preprocessing management module 130. The preprocessing management module 130 is thus not allowed to immediately send a preprocessing request of the image B to the preprocessing execution module 140. The preprocessing management module 130 then waits until reception of the notification of completion of the preprocessing of the image A from the preprocessing execution module 140 and sends the preprocessing request of the image B to the preprocessing execution module 140.

The preprocessing execution module 140 receives the preprocessing request of the image B and starts the required preprocessing of the image B.

As mentioned above, the preprocessing execution module 140 performs the preprocessing of the image B in the vacant time when the other functional blocks of the main processor 100 are not activated. For the simplicity of explanation, here it is assumed that all the functional blocks of the main processor 100 other than the preprocessing execution module 140 are not activated but stand by. The preprocessing execution module 140 is thus allowed to immediately start the preprocessing of the image B.

On completion of the preprocessing of the image B, the preprocessing execution module 140 sends a notification of completion of the preprocessing of the image B to the preprocessing management module 130.

In response to the user's operation of the print start button 510 (see FIG. 4) to give a print start instruction, the UI module 120 instructs the image processing management module 150 to start a required series of image processing for printing.

The image processing management module 150 controls the image processing for printing in the order of the image A and the image B. The image processing management module 150 first sends a preprocessing request of the image A to the preprocessing management module 130.

The preprocessing of the image A has been completed in advance, and the result of the advanced preprocessing has been stored in the shared memory 70. The preprocessing management module 130 thus immediately sends a notification of completion of the required preprocessing to the image processing management module 150, in response to the preprocessing request of the image A.

The image processing management module 150 receives the notification of completion of the preprocessing of the image A and repeatedly sends an image processing request for each band of the image A to the image processing module 160.

According to the concrete procedure, the image processing management module 150 first sends an image processing request to the image processing module 160 to perform the required image processing for printing with regard to the band 1 of the image A. The image processing module 160 receives the image processing request and sends a decoding operation request via the image processing control module 200A to the decoding operation module 200B to perform the decoding operation. The decoding operation module 200B receives the decoding operation request and performs the decoding operation of the band 1 of the image A. On completion of the decoding operation, the decoding operation module 200B sends a notification of completion of the decoding operation to the image processing control module 200A. The image processing control module 200A receives the notification of completion of the decoding operation and sends an image correction request to the image correction module 200C to correct the band 1 of the image A. The image correction module 200C receives the image correction request and corrects the band 1 of the image A with the correction parameters set by the preprocessing of the image A and stored in the shared memory 70. On completion of the correction of the band 1 of the image A, the image correction module 200C notifies the image processing control module 200A of completion of the image correction. The image processing control module 200A sends a notification of completion of the required decoding operation with regard to the band 1 of the image A to the image processing module 160 after completion of the other processing performed by the image processing control module 200A. The image processing module 160 receives the notification of completion of the decoding operation and notifies the image processing management module 150 of completion of the required image processing for printing with regard to the band 1 of the selected image A.

The required image processing for printing described above with regard to the band 1 of the image A is repeated until completion of the image processing for all the bands 'n' of the image A and the image processing for all the bands of the image B.

A5. Effects of Embodiment

As described above, the print control apparatus 10 of the embodiment displays each preview photo image represented by photo image data stored in the memory card 52. When the user sets the number of prints of the displayed preview photo image, the print control apparatus 10 specifies the displayed preview photo image as a print object image and starts required preprocessing prior to the user's print start instruction. This arrangement desirably shortens a time period elapsed before start of required image processing for printing and thereby shortens a wait time before start of the actual printing operation, compared with the conventional print control apparatus that performs preprocessing of a specified print object image after the user's print start instruction and subsequently executes required image processing for printing.

In the print control apparatus 10 of the embodiment, when the user resets the number of prints to 0, the UI module 120 requests the preprocessing management module 130 to terminate the previously requested advanced execution of preprocessing. When the preprocessing as the target of the termination request is currently being executed, the preprocessing management module 130 sends a cancellation request to the preprocessing execution module 140 to cancel out the preprocessing. When the preprocessing as the target of the termination request regards an unprocessed advanced preprocessing request, the preprocessing management module 130 deletes the unprocessed advanced preprocessing request from the advanced preprocessing request buffer. This stops advanced implementation of non-required preprocessing and ensures efficient advanced implementation of required preprocessing in response to a subsequent advanced preprocessing request, thus effectively shortening the wait time.

When there are plural unprocessed advanced preprocessing requests, the print control apparatus 10 of the embodiment performs the requested preprocessing not in the request order of advanced preprocessing by the user's selection of print object images on the selection window but in the preset order. The procedure of the embodiment executes the required image processing for preview display and the required image processing for printing in the alphabetical order of image file names retrieved in the initialization process. The order of advanced execution of preprocessing is identical with the printing order.

This arrangement ensures efficient preprocessing and desirably shortens the wait time even when the request order of advanced implementation of preprocessing is different from the actual printing order.

Figure 11:
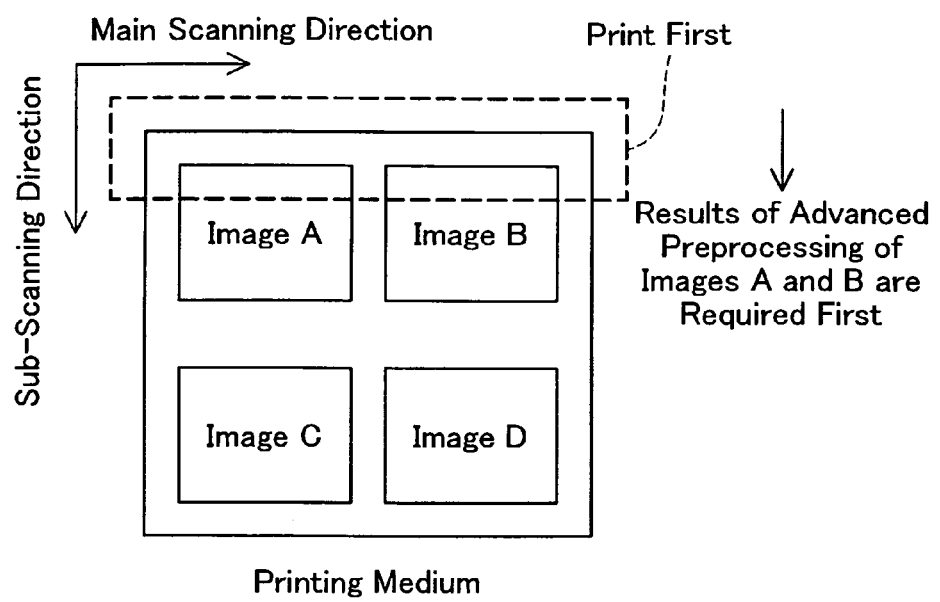
FIG. 11 shows a multi-image layout.

For example, in the case of printing a multi-image layout, results of advanced preprocessing with regard to images A and B are required first as shown in FIG. 11. Here it is assumed that the user selects print object images in the order of image C, image D, image B, and image A. Execution of preprocessing in this image selection order does not attain the expected effects of advanced preprocessing. The procedure of the embodiment implements advanced preprocessing in response to unprocessed advanced preprocessing requests not in the image selection order but in the order of actual printing operations. This effect of the embodiment is especially prominent for printing the multi-image layout.

The execution order of advanced preprocessing is not restricted to the actual printing order described in the embodiment but may be the order of the user's selection of print object images on the selection window.

In the structure of the embodiment, the actual image processing operations are performed not by the main processor 100 but by the three sub-processors 200A through 200C. This arrangement enables the high-speed processing and allows the effective use of the vacant time for execution of the preprocessing in the main processor 100, thus desirably shortening the total processing time.

B. MODIFICATIONS

The embodiment discussed above is to be considered in all aspects as illustrative and not restrictive. There may be many modifications, changes, and alterations without departing from the scope or spirit of the main characteristics of the present invention.

B1. Modified Example 1

The procedure of the embodiment performs the sampling process during advanced execution of preprocessing. One modified procedure may perform the sampling process to create a histogram during execution of the preview process for preview display.

B2. Modified Example 2

The procedure of the embodiment sets the number of prints of a displayed preview photo image to selectively specify the displayed preview photo image as a print object image. This operation is, however, not restrictive. One modified structure provides an exclusive button for specification of print object images. Any other suitable method may be adopted to specify a displayed preview photo image as a print object image prior to a print start instruction by the user's press of a print start button.

It is not essential to specify each displayed preview photo image as one print object image. One possible modification may display a list of thumbnail images or a list of image file names. The user selects and specifies one or multiple images as print object images in the list of thumbnail images or in the list of image file names. An 'all print' button may additionally be provided to select and specify all images as print object images.

In this modified arrangement, photo image data compressed in the JPEG format are not expanded for preview display. A decoding operation of photo image data as an object of advanced preprocessing is accordingly required prior to the advanced preprocessing. This modified application requires an extra time for execution of the decoding operation and is less effective than the procedure of the embodiment. The modified procedure, however, still enables advanced implementation of preprocessing prior to the print start instruction and thus desirably shortens the wait time.

B3. Modified Example 3

The description of the embodiment does not specify the allowable number of advanced preprocessing requests simultaneously stored in the advanced preprocessing request buffer. A large number of advanced preprocessing requests may undesirably worsen the processing efficiency. The advanced preprocessing requests simultaneously stored in the advanced preprocessing request buffer may thus be limited to a predetermined number. For example, the allowable number of advanced preprocessing requests for storage may be restricted to the number of simultaneously printable images on a multi-image layout, for example, 4 images, 8 images, or 16 images.

Finally the present application claims the priority based on Japanese Patent Application No. 2006-11900 filed on Jan. 20, 2006, which is herein incorporated by reference.

What is claimed is:

1. A print control apparatus that, in response to a print instruction of a specified print object image, corrects print object image data of the specified print object image with a preset correction parameter set for improving picture quality of the specified print object image and prints the specified print object image according to corrected print object image data, the print control apparatus comprising:
    a selection instruction receiving module that receives a selection instruction for selecting the specified print object image from among at least one image;
    a print object image specification module that specifies an image as the print object image in response to a user selection of the image based on the selection instruction;
    a print instruction receiving module that receives the print instruction;

a preprocessing execution module that performs an advanced preprocessing of the print object image data representing the specified print object image to set the correction parameter used for correcting the specified print object image, prior to a user selection of the print instruction, without performing correction of the specified print object image;

a preprocessing management module that, in response to the print object image specification module specifying the print object image, instructs the preprocessing execution module to implement the advanced preprocessing, prior to receiving the user selection of the print instruction;

an image correction module that corrects the print object image data of the specified print object image using the correction parameter set by the preprocessing execution module, after receiving the user selection of the print instruction; and a cancel instruction receiving module that receives a cancel instruction for cancelling the selection instruction, wherein the preprocessing execution module terminates the advanced preprocessing of the print object image data representing the specified print object image when the cancel instruction receiving module receives a cancel instruction.

2. The print control apparatus in accordance with claim 1, wherein the preprocessing management module instructs the preprocessing execution module to implement advanced preprocessing in a preset order with regard to plural unprocessed preprocessing requests of plural print object images specified by the print object image specification module.

3. The print control apparatus in accordance with claim 1, wherein the correction parameter includes at least one parameter selected from a first parameter group obtained by a statistical process of the print object image data representing the specified print object image, a second parameter group obtained by a face recognition process of the print object image data, and a third parameter group obtained by a red-eye reduction process of the print object image data.

4. The print control apparatus in accordance with claim 1, the print control apparatus further comprising: a data expansion module that expands compressed image data in a specific format, wherein the print object image specification module displays a preview image based on expanded image data, which is obtained by expansion of compressed image data by the data expansion module, and, in response to selection of the displayed preview image as a printing object, specifies an image represented by the expanded image data corresponding to the selected preview image as a print object image, and the preprocessing management module instructs the preprocessing execution module to implement advanced preprocessing of the expanded image data as the print object image data.

5. The print control apparatus in accordance with claim 4, wherein in response to specification of the image represented by the expanded image data as the print object image, the preprocessing management module instructs the preprocessing execution module to perform sampling of predetermined pixels from the expanded image data and to set the correction parameter based on a result of the sampling.

6. The print control apparatus in accordance with claim 4, wherein in response to specification of the image represented by the expanded image data as the print object image, the preprocessing management module instructs the preprocessing execution module to perform sampling of predetermined pixels from the expanded image data in advance prior to display of the preview image, and to set the correction parameter based on a result of the advanced sampling.

7. A print control method that, in response to a print instruction of a specified print object image, corrects print object image data representing the specified print object image with a preset correction parameter set for improving picture quality of the specified print object image and prints the specified print object image according to corrected print object image data, the print control method comprising the steps of:

receiving a selection instruction for selecting the specified print object image form among at least one image;

specifying an image as the print object image in response to a user selection of the image based on the selection instruction;

receiving the print instruction;

performing advanced preprocessing of the print object image data representing the specified print object image to set the correction parameter used for correcting the specified print object image, prior to receiving a user selection of the print instruction;

in response to the step of specifying, giving an instruction for implementing advanced preprocessing of the print object image data representing the specified print object image in the performing step, prior to the print instruction;

correcting the print object image data of the specified print object image using the correction parameter set in the performing step, after receiving the user selection of the print instruction, receiving a cancel instruction for cancelling the selection instruction, and terminating the advanced preprocessing of the print object image data representing the specified print object image when the cancel instruction is received.

* * * * *